(12) United States Patent
Gyorfi et al.

(10) Patent No.: US 7,461,035 B2
(45) Date of Patent: Dec. 2, 2008

(54) PATH DETERMINATION FACILITATION METHOD

(75) Inventors: Julius S. Gyorfi, Vernon Hills, IL (US); Daniel R. Gamota, Palatine, IL (US); Swee M. Mok, Palatine, IL (US); John B. Szczech, Schaumburg, IL (US); Mansour Toloo, Palatine, IL (US); Jie Zhang, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/259,482

(22) Filed: Oct. 26, 2005

(65) Prior Publication Data

US 2007/0094165 A1   Apr. 26, 2007

(51) Int. Cl.
G06F 15/18 (2006.01)
(52) U.S. Cl. .......................... 706/13; 701/209
(58) Field of Classification Search ................. 700/104; 701/200, 201, 209; 706/25, 12, 14, 45, 47; 707/3, 6
See application file for complete search history.

(56) References Cited

U.S. PATENT DOCUMENTS

| | | | | |
|---|---|---|---|---|
| 6,299,934 | B1* | 10/2001 | Manning | 427/137 |
| 6,310,883 | B1* | 10/2001 | Mann et al. | 370/408 |
| 6,721,647 | B1 | 4/2004 | Kita et al. | |
| 7,079,943 | B2* | 7/2006 | Flann et al. | 701/202 |
| 2005/0216182 | A1* | 9/2005 | Hussain et al. | 701/200 |

OTHER PUBLICATIONS

Dozier, G., Esterline, A., Homaifar, A. and Bikdash, M., *Hybrid Evolutionary Motion Planning via Visibility-Based Repair*, IEEE International Conference on Evolutionary Computation, pp. 507-511, 1997, (5 pages).
Leu, W., Wong, H., and Ji, Z., *Planning of Component Placement/Insertion Sequence, and Feeder Setup in PCB Assembly Using Genetic Algorithm*, ASME Journal of Electronic Packaging, vol. 115, 1993, pp. 424-431, (9 pages).
Fu, K.S., Gonzalez, R.C., and Lee, C.S.G. *Robotics: Control, Sensing, Vision, and Intelligence* New York: McGraw-Hill, Inc., 1987, pp. 483-484 (3 pages).

* cited by examiner

*Primary Examiner*—David R Vincent
*Assistant Examiner*—Kalpana Bharadwaj

(57) ABSTRACT

One facilitates determination of a path that comprises a plurality of specific locations (201). In an optional though preferred embodiment these specific locations comprise locations where a given functional ink will preferably be printed using a continuous printing spray. Also in an optional though preferred embodiment this path will also avoid at least one predetermined area (701) where such a functional ink should not be printed. In a preferred approach this process (100) generally provides for identifying (101) these specific locations and further identifying (102), when applicable, the one or more predetermined areas to be avoided. This process then preferably uses a processor to effect at least one (and preferably both) of using (103) a genetic algorithm to identify a preferred path that includes the plurality of specific locations and using (104) an A* algorithm to process a candidate path to provide a selected path that includes the plurality of specific locations while also avoiding the at least one predetermined area.

17 Claims, 6 Drawing Sheets

|  | GENE 1 | GENE 2 | GENE 3 | GENE 4 | GENE 5 |
|---|---|---|---|---|---|
| POLYLINE | E | D | C | B | A |
| DIRECTION FLAG | F | T | T | F | F |

500

PATH DETERMINATION FACILITATION METHOD

TECHNICAL FIELD

This invention relates generally to path determination and more particularly to determining a path that includes specific desired locations while also avoiding at least one predetermined area.

BACKGROUND

Considerable activity and study now relates to the use of various printing techniques to yield printed semiconductor devices. These techniques typically comprise using one or more printing techniques to place a plurality of different materials (usually in the form of functional inks having varying desired functional properties relating to conductivity, insulation, semiconductivity, and so forth) on a printing substrate of choice. Some of these processes employ a continuous printing spray; that is, the spray of ink does not typically start and stop during the printing of a given substrate but rather continues to operate as the spray mechanism and printing substrate move relative to one another.

Such a spray is maintained for any of a variety of reasons when so employed. Unfortunately, however, such a process may give rise to other problems. For example, in many cases there may be specific areas on the printing substrate that the corresponding spray of functional ink must preferably avoid. In other words, the continuously operating printing spray must preferably avoid rather than traverse a given area of the printing substrate. Such a circumstance arises, for example, when the functional aspects of a given functional ink are highly incompatible with the intended functional operation of a given area of the printing substrate.

In such a case it then becomes necessary to identify and program a path for the continuous printing spray to follow that will ensure both that desired areas are sprayed while also avoiding areas where such a print deposit is less desirable or even counterproductive. Skilled printing practitioners can be employed to ascertain such a path. This practice, however, may be unduly time consuming (especially when employed in conjunction with relatively small print runs yielding only a relatively small number of printed substrates). In many cases, though, it may be necessary to identify an appropriate print spray path for a very large number of desired areas which would not be feasible without an automated procedure such as the one being disclosed.

Further, there are no guarantees that the person attempting the task will, in fact, achieve an optimum solution. While one can be relatively certain that a given path will in fact include the desired points while avoiding the undesired areas, it can be considerably more daunting to determine whether a shortest path has been identified. In some cases the functional inks employed may be so inexpensive as to make this point less important. In many instances, however, the functional ink may be relatively expensive. This, in turn, makes it more important to identify a shortest path that will, in turn, require a smallest amount of functional ink.

BRIEF DESCRIPTION OF THE DRAWINGS

The above needs are at least partially met through provision of the path determination facilitation method described in the following detailed description, particularly when studied in conjunction with the drawings, wherein.

Figure 1:
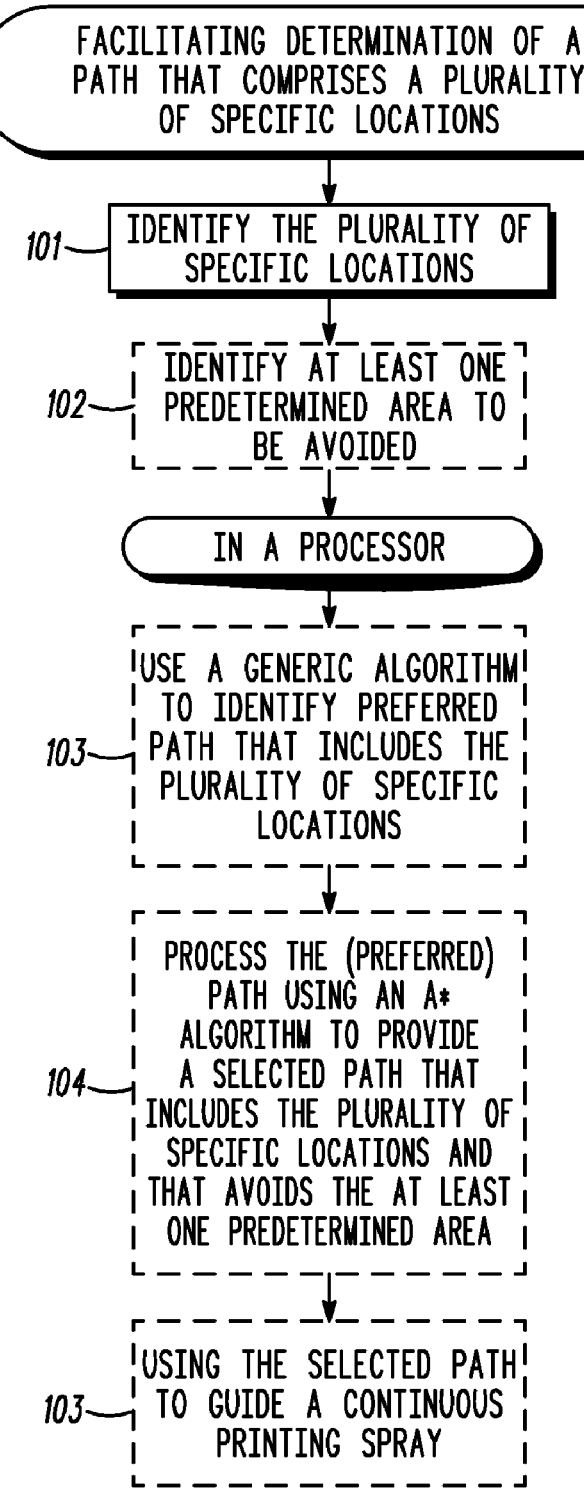
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, one facilitates determination of a path that comprises a plurality of specific locations. In an optional though preferred embodiment these specific locations comprise locations where a given functional ink will preferably be printed using a continuous printing spray. Also in an optional though preferred embodiment this path will also avoid at least one predetermined area where such a functional ink should not be printed.

In a preferred approach this process generally provides for identifying these specific locations and further identifying, when applicable, the one or more predetermined areas to be avoided. This process then preferably uses a processor to effect at least one (and preferably both) of using a genetic algorithm to identify a preferred path that includes the plurality of specific locations and using an A* algorithm to process a candidate path to provide a selected path that includes the plurality of specific locations while also avoiding the at least one predetermined area.

In a preferred approach the genetic algorithm has at least one gene that comprises at least one polyline representing a path segment to be traversed in a particular direction. In a further preferred approach the genetic algorithm also comprises a genetic operation that comprises reversing a direction by which a given path segment is traversed.

Also pursuant to an optional but preferred approach the A* algorithm includes characterizing the at least one predetermined area as a 2 dimensional polygon. This, in turn, permits using the A* algorithm by determining when a path candidate intersects with such a 2 dimensional polygon and then modifying that path candidate to include one or more vertices of that 2 dimensional polygon such that the resultant modified path candidate no longer intersects the 2 dimensional polygon.

So configured, a viable path solution will tend to converge that can then be employed to guide a continuous printing spray during, for example, the manufacture of printed semiconductor devices and circuits. (As used herein, "continuous printing," "continuous spraying," and "continuous printing spray" (and their various formatives) shall all be understood to refer in general to any continuous ink application process (including both contact and non-contact continuous ink application processes) such as, but not limited to, continuous ink jet printing, continuous microdispensing, and so forth.) These processes are readily employed in a highly automated fashion and do not tend to require the oversight of an experienced printer. These processes should also tend to reliably identify a relatively short path that meets the stipulated traversal requirements.

These and other benefits will become more evident to those skilled in the art upon making a thorough review and study of the following detailed description.

Referring now to the drawings, and in particular to FIG. 1, an overall process representative of these various teachings comprises a process 100 to facilitate determination of a path that comprises a plurality of specific locations and, preferably though optionally, that avoids at least one predetermined area. Accordingly, this process 100 provides for identifying 101 the plurality of specific locations and also identifying 102 any such predetermined areas to be avoided.

Figure 2:
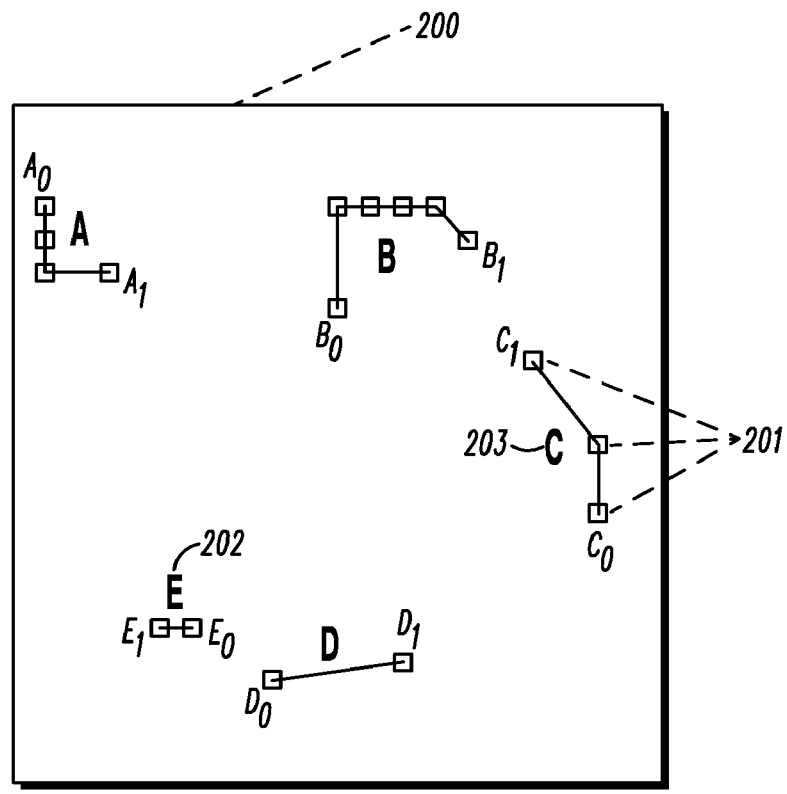
FIG. 2 comprises a top plan view of a printing substrate as configured in accordance with various embodiments of the invention.

To illustrate, and referring momentarily to FIG. 2, a given printing substrate 200 of choice can have such a plurality of specific locations (represented in FIG. 2 by the small squares denoted, in some cases, by the reference numeral 201). Such specific locations can comprise, for example, places on the printing substrate 200 where a particular functional ink is to be printed by use of a continuous printing spray.

As used herein, genes refer to polylines that connect two or more such specific locations. For example, polyline E 202 comprises a line that connects point $E_0$ to point $E_1$ while polyline C 203 comprises a pair of lines that connect the three specific locations that are denoted by reference numeral 201. These polylines, in turn, represent the path where functional ink is to be printed as per the present illustrative example. A sequence of genes, often referred to as a chromosome, determines the order in which multiple polylines as depicted are connected and traversed. For example, a chromosome would serve in the present example to stipulate how polylines A through E are connected to one another and the direction of traversal.

Figure 3:
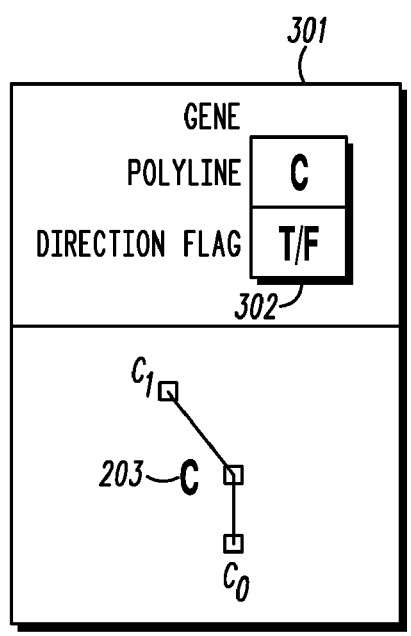
FIG. 3 comprises a schematic view of a gene representing a polyline with an associated direction flag.
Figure 4:
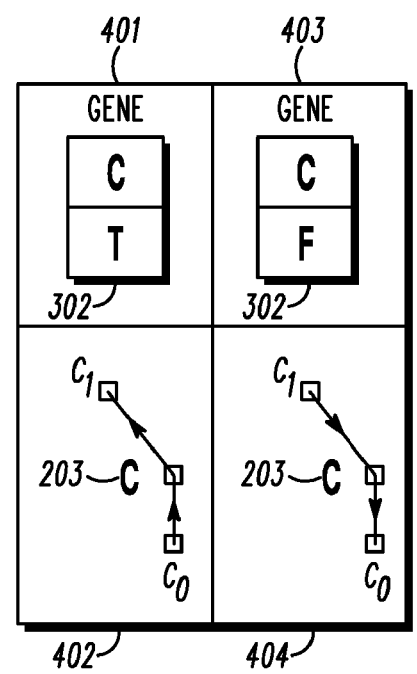
FIG. 4 depicts the two directions of traversal for the polyline represented by the gene in FIG. 3 given the two possible values of the direction flag.

As noted above, a gene will identify not only the points that comprise a corresponding polyline but also the direction by which this polyline is traversed. Referring to FIG. 3, the aforementioned polyline C 203 specifies a path that must be traversed in some direction. The endpoints of the polyline are given as $C_0$ and $C_1$ but this implies no particular order. To address this issue, the gene 301 representing this polyline C 203 has a direction flag 302 that specifies the direction of traversal. In this embodiment a TRUE (T) value for the direction flag 302 represents a traversal from $C_0$ to $C_1$ and a FALSE (F) value of the direction flag 302 represents a traversal from $C_1$ to $C_0$. These results are illustrated in FIG. 4 where a TRUE direction flag 302 in a first expression of the gene 401 for polyline C 203 results in a first version 402 thereof where the polyline is traversed from $C_0$ to $C_1$ and where a FALSE direction flag 302 in a second expression of the gene 403 for polyline C 203 results in a second version 404 thereof where the polyline is traversed in a reversed direction as illustrated.

Figures 5, 6:
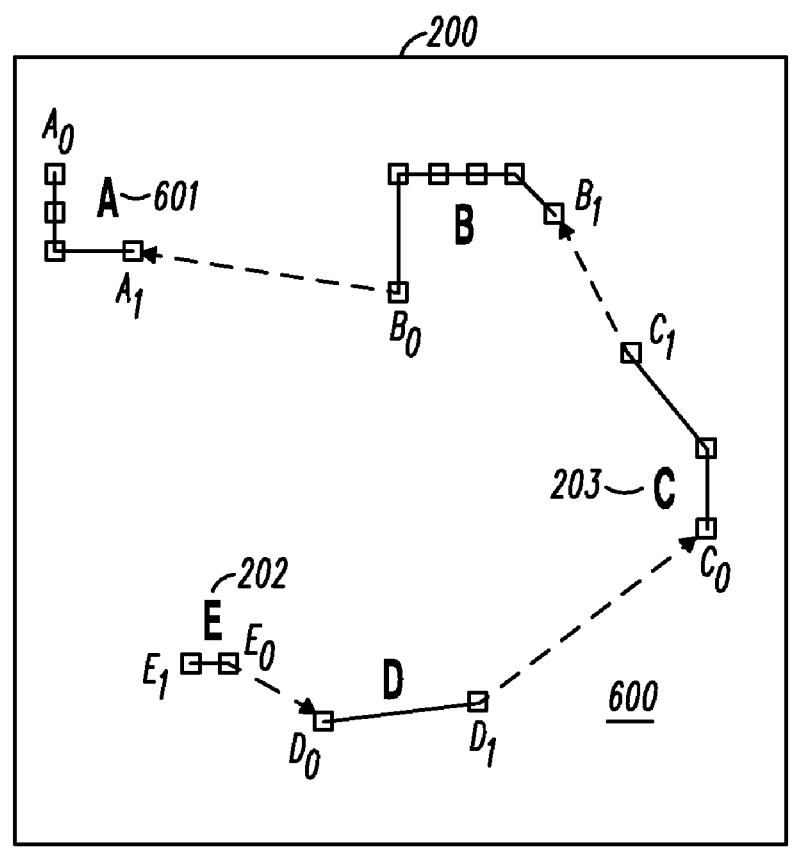
FIG. 5 comprises a schematic view of a chromosome composed of several genes.
FIG. 6 depicts the path corresponding to the chromosome shown in FIG. 5.

As noted above, a sequence of genes, called a chromosome, determines the order in which multiple polylines are connected and traversed. FIG. 5 provides a representation of an illustrative chromosome 500 that connects polylines A through E as were previously shown in FIG. 2. This chromosome 500 depicts which polylines are connected to which, in which order, and in which direction of traversal (as per the respective ordering of the genes themselves and the values of the direction flags). The solution path 600 as corresponds to the instructions and stipulations of such a chromosome is presented in FIG. 6 where it can be seen that this solution path 600 begins with point $E_1$ in polyline E 202 and concludes with point $A_0$ in polyline A 601.

Figure 7:
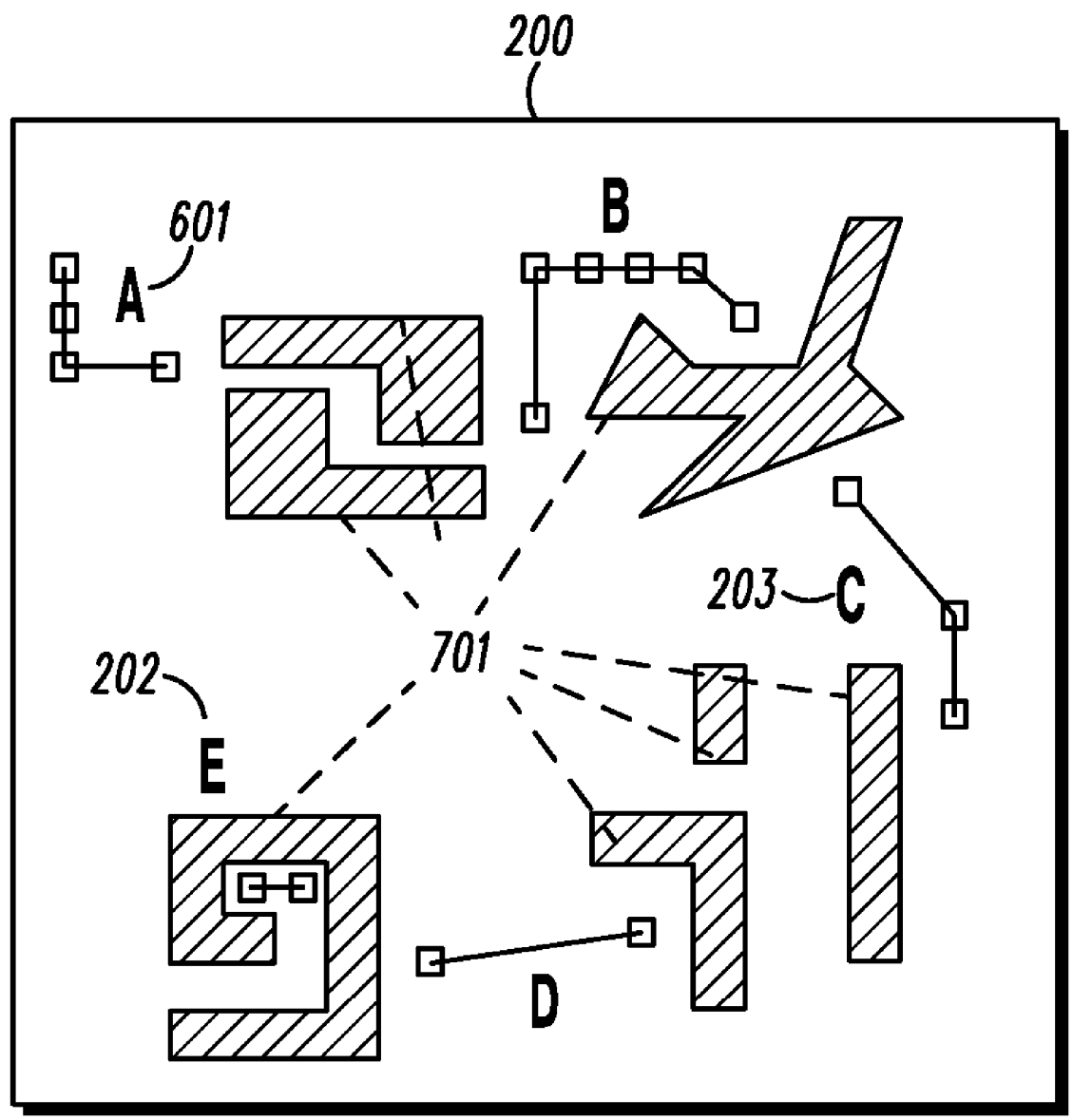
FIG. 7 depicts the addition of polygonal areas to be avoided to the layout shown in FIG. 2.

In a preferred embodiment, the areas to be avoided are particularly characterized for purposes of this process 100 as 2 dimensional polygons. Such areas are shown in FIG. 7 and are denoted by reference numeral 701. The purpose and benefits of optionally characterizing such areas to be avoided as 2 dimensional polygons will be discussed in more detail below. Those skilled in the art will recognize that polylines A through E and areas to be avoided 701 can comprise actually visible discrete entities if desired (and as may be suggested by the illustration depicted in FIG. 7) or, more preferably, can comprise logical areas that are located, for example, within the memory of a corresponding processor using, for example, a coordinate system of choice.

Referring again to FIG. 1, this process 100 then uses a processor of choice (comprising, for example, a programmable platform (or platforms) such as a personal computer or the like) to effect at least one of usage 103 of a genetic algorithm to identify a preferred path that includes the plurality of specific locations and/or to process 104 a (or the) preferred path (or multiple candidate paths) using an A* algorithm to thereby provide a selected path that includes the plurality of specific locations and that avoids the at least one predetermined area.

Genetic algorithms are known in the art and tend to resolve towards a particular solution through a process that essentially mimics natural selection. One or more candidate solution sets are formed or provided and are evaluated with respect to one or more measurement criteria of choice. For example, in the present scenario, "best" may correspond to a shortest overall path length. A best solution (or any "good" solution) is then used to generate a next set of candidate solutions which are again then tested against the criteria of choice.

This often includes carrying forward one or more of the existing good solutions in a present form and also changing one or more the existing good solutions in order to provide a changed version as part of the next set of candidate solutions. Such changes are caused by any of a variety of genetic operations. Known genetic operations include mutation operations, inversion operations, and crossover operations. In an optional but preferred approach, an additional genetic operation comprising a reverse operation is also used to effect some of these changes.

Figure 8:
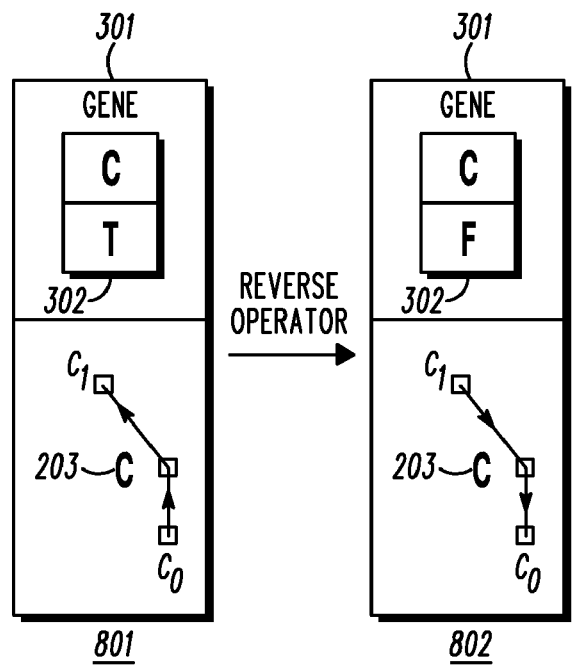
FIG. 8 schematically depicts usage of the disclosed reverse operator.

This reverse operation provides a simple yet powerful genetic operation by which a given path can be modified to test for further improvements. By way of illustration and example, and referring momentarily to FIG. 8, such a reverse operator can be applied to an illustrative polyline C 203 as comprises a first expression 801 of a corresponding gene 301 by reversing the direction flag 302 (in this example, from a TRUE value to a FALSE value) to thereby yield a second, reversed expression 802 of this gene 301 for polyline C 203.

Figure 9:
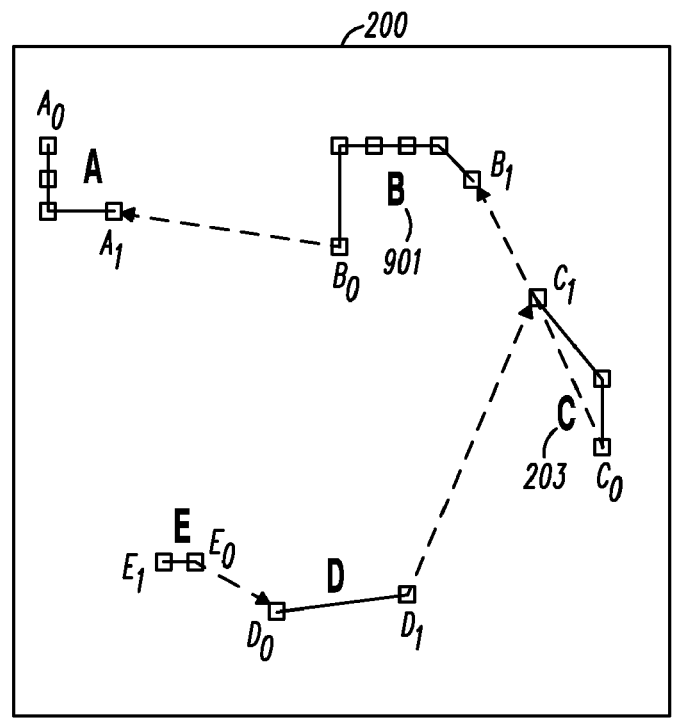
FIG. 9 depicts a change in a path corresponding to use of the reverse operator.

To carry this illustrative example forward, the corresponding effect of this change is shown in FIG. 9. So defined, the path now connects point $D_1$ to point $C_1$ of polyline C 203 instead of point $C_0$ as was the case in the earlier unreversed example shown in FIG. 6. Similarly, polyline C 203 now connects to polyline B 901 by connecting point $C_0$ to point $B_1$. Comparing this path to the previous path identified in FIG. 6, and presuming that these drawings are to scale, the path solution offered in FIG. 6 is somewhat shorter than the path solution offered in FIG. 9 and hence is "better" (presuming again that length is a primary measure of what is good).

So configured, and in accordance with general practice, a genetic algorithm can be cycled in this manner as many times as may be desired. Such algorithms are often processed in a non-deterministic way and simply continue to tend to converge towards a particular solution without necessarily self-recognizing that a best solution has apparently been achieved. As with all genetic algorithms, some thresholding method must be used to determine when to terminate the process. Iteration limit thresholds will guarantee convergence, but not optimality since one does not typically know beforehand how many iterations will be necessary to yield an optimal result. Performance improvement thresholds will terminate processing when the current iteration's best candidate solution is within a specified range of the previous iteration's best candidate solution. This too will eventually ensure convergence, but it may suffer from other problems such as premature termination if early iterations yield similar results through random chance or excessive processing time when convergence occurs slowly. A combination of iteration and performance improvement thresholds may offer better performance than either alone.

The above-mentioned A* algorithm is also generally known in the art. Such algorithms tend to comprise a type of graph search technique (also known as a best-first search). One typically employs this technique by estimating an initial path and then seeking to better that estimate in a dynamic manner. Such an approach, for example, will typically cease to traverse a given path if a better one becomes evident. In a preferred approach this A* algorithmic approach is applied to a (or the best) candidate path from the genetic algorithm in order to circumvent the areas to be avoided that are characterized by corresponding 2 dimensional polygons.

This modified approach further accommodates using the periphery of such a 2 dimensional polygon as an acceptable path (hence, moving along the periphery of the polygon from one vertex to another vertex is permitted). To avoid permitting movement through the polygon (and hence through the area to be avoided), this modification is preferably bound by the condition that movement from one vertex to another is only permitted to the extent that both vertices are visible to one another. This condition will then permit only movement along the periphery of the polygon and not through the polygon.

Figure 10:
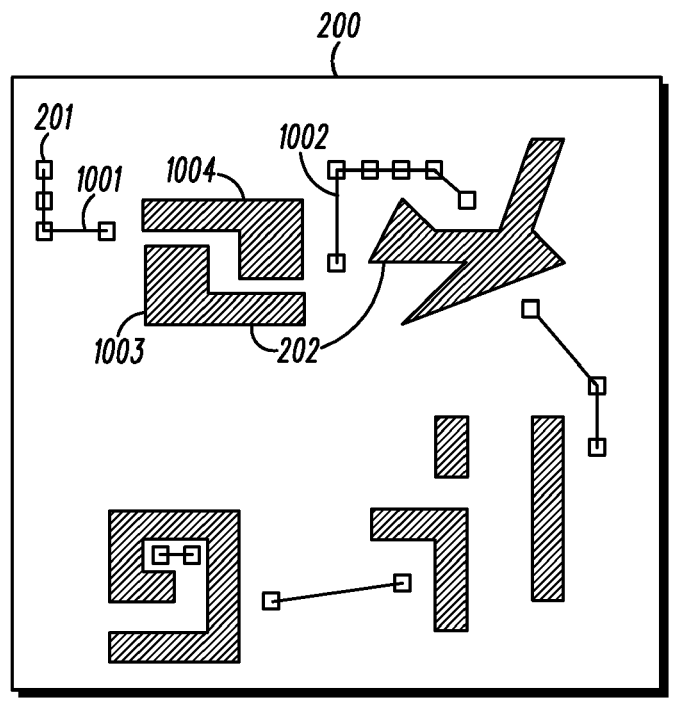
FIG. 10 comprises a top plan view of a printing substrate as configured in accordance with various embodiments of the invention.
Figure 11:
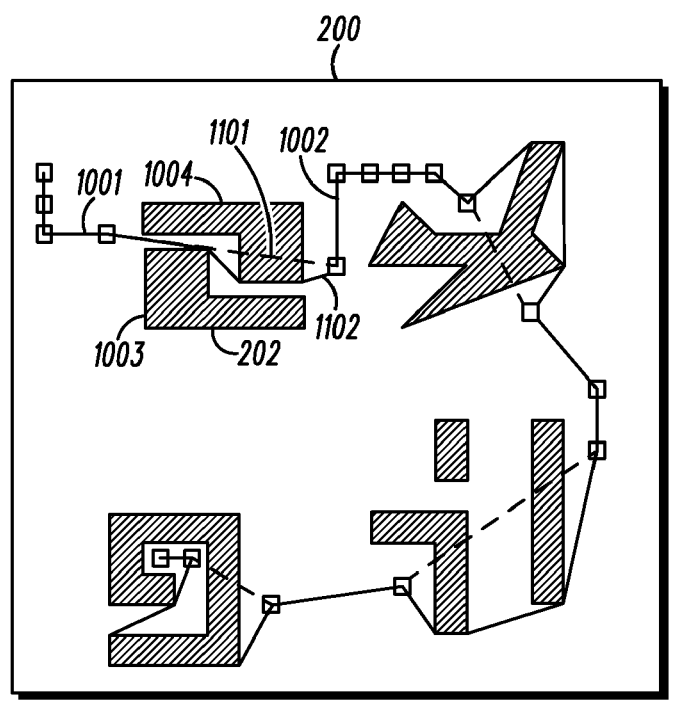
FIG. 11 comprises a top plan view of a printing substrate as configured in accordance with various embodiments of the invention.

To illustrate, and referring now to FIG. 10, it can be seen that a first and second predetermined area 1003 and 1004 at least partially block potential paths that might otherwise connect a first polyline 1001 to a second polyline 1002. For example, and referring now to FIG. 11, a first potential connecting pathway 1101 (depicted by a phantom line in FIG. 11) will pass directly through the second above-mentioned predetermined area 1004 to be avoided. By these preferred teachings, however, this interconnecting pathway is permitted by (and constrained in such a setting to) moving from vertex to vertex along the peripheries of the 2 dimensional polygons that serve to encapsulate the predetermined areas to be avoided. Accordingly, in this illustrative example and as denoted by reference numeral 1102, one such compliant pathway moves from the first polyline 1001 to a vertex of the first predetermined area 1003 and then to a vertex of the second predetermined area 1004. The pathway then moves along the periphery of the 2 dimensional polygon that represents the second predetermined area 1004 to a next visible vertex where the pathway can then be directed straight towards the second polyline 1002.

It will therefore be seen that by representing areas to be avoided as 2 dimensional polygons (which need not have a boundary that matches exactly with the corresponding area to be avoided so long as the latter is essentially contained within the former) and by constraining movement of a candidate path to movement along the periphery of that 2 dimensional polygon via movement from one vertex to another visible vertex one can move with assurance around such areas to a next polyline of interest. Numerous other examples in this regard are presented in FIG. 11 for the benefit of the interested reader.

As noted above, the process 100 described in FIG. 1 provides for use of at least one of the above-described genetic algorithm and A* algorithm. In a preferred approach this process 100 makes use of both. By one such approach, the genetic algorithm is used to provide a given selected pathway and the A* algorithm is then employed to essentially fine tune that selected pathway to provide the pathway to be used. By another such approach, the A* algorithm is also employed during one or more cycles of the genetic algorithm's operation as a test (exclusively or in combination with other tests) of the various candidate pathways produced by the genetic algorithm to aid in selecting those candidates which will persist (and/or be further changed) for at least another cycle of the genetic algorithm process.

With continued reference to FIG. 1, in an optional though preferred process, the selected path is then used 105 to guide a continuous printing spray. As noted above, this continuous printing spray may serve to apply a functional ink to a substrate of choice as part of a printed semiconductor printing process. Such a substrate can comprise any suitable material including various rigid and non-rigid materials. In a preferred embodiment, the substrate comprises a flexible substrate comprised, for example, of polyester or paper. The substrate can be comprised of a single substantially amorphous material or can comprise, for example, a composite of differentiated materials (for example, a laminate construct). In a typical embodiment the substrate will comprise an electrical insulator though for some applications, designs, or purposes it may be desirable to utilize a material (or materials) that tend towards greater electrical conductivity.

Those skilled in the printing arts are familiar with both graphic inks and so-called functional inks (wherein "ink" is generally understood to comprise a suspension, solution, or dispersant that is presented as a liquid, paste, or powder (such as a toner powder) and where "functional" shall be understood to refer to the electrical properties of the ink material (such as, but not limited to, electrically conductive properties, insulating properties, dielectric properties, and semiconducting properties, to name a few). These functional inks are further comprised of metallic, organic, or inorganic materials having any of a variety of shapes (spherical, flakes, fibers, tubes) and sizes ranging, for example, from micron to nanometer. Functional inks find application, for example, in the manufacture of some membrane keypads. Though graphic inks can be employed as appropriate in combination with this process, these inks are more likely, in a preferred embodiment, to comprise a functional ink.

In a preferred approach described above, such inks are placed on a substrate by use of a corresponding printing technique including, in this example, a continuous printing spray. Those familiar with traditional semiconductor fabrication techniques such as vacuum deposition will know that the word "printing" is sometimes used loosely in those arts to refer to such techniques. As used herein, however, the word "printing" is used in a more mainstream and traditional sense and does not include such techniques as vacuum deposition that involve, for example, a state change of the transferred medium in order to effect the desired material placement. Accordingly, "printing" will be understood to include such techniques as screen printing, offset printing, gravure printing, xerographic printing, flexography printing, inkjetting, microdispensing, stamping, and the like. It will be understood that these teachings are compatible with the use of a plurality of such printing techniques during fabrication of a given element such as a semiconductor device. For example, it may be desirable to print a first device element (or portion of a device element) using a first ink and a first printing process and a second, different ink using a second, different print process for a different device element (or portion of the first device element).

Those skilled in the art will recognize that these teachings may be employed to quickly and reliably identify a particular pathway that may be traversed by a continuous printing spay during a semiconductor printing process that will both ensure the printing of a desired functional ink at a plurality of specific locations where such material will serve a desired functional purpose as regards the construction and/or interconnection of various electrical devices while also avoiding specific areas where such material should not be printed in order to avoid diminished and/or otherwise impeded functionality of other electrical devices. It will also be appreciated that these teachings also tend to provide a relatively efficient pathway that should therefore tend to aid in reducing the overall length of the pathway to thereby tend to minimize the amount of functional ink that must be expended during the printing process.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, while a given printable circuit diagram may comprise a given plurality of the aforementioned specific locations, specific printed circuits may not require that each and every such specific location be treated by the aforementioned continuous ink deposition process. This may be the case, for instance, when at least some of the specific locations correspond to different specific alternative circuit configurations (as when the circuit design is customizable to a degree by including, or excluding specific circuit elements that correspond to such optional specific locations). It will be understood that such circumstances can be readily accommodated by these teachings as applied to the remaining specific locations that are to receive continuous ink application treatment.

We claim:

1. A processor-implemented method to facilitate determination of a path that comprises a plurality of specific locations and that avoids at least one predetermined area, comprising:
   identifying the plurality of specific locations;
   identifying the at least one predetermined area to be avoided;
   in a processor:
   using a genetic algorithm to identify a preferred path that includes the plurality of specific locations, the genetic algorithm not altering characteristics of the preferred path and wherein the preferred path is identified by the genetic algorithm without consideration of the at least one predetermined area;
   processing the preferred path using an A* algorithm to provide a selected path having a minimum distance around the at least one predetermined area such that the selected path includes the plurality of specific locations and avoids the at least one predetermined area;
   wherein the plurality of specific locations comprise locations to be sprayed during a printing process.

2. The method of claim 1 wherein using a genetic algorithm to identify a preferred path comprises using a genetic algorithm having at least one gene that comprises at least one polyline, wherein the polyline comprises multiple contiguous path segments.

3. The method of claim 1 wherein using a genetic algorithm to identify a preferred path comprises using a genetic algorithm having a genetic operation comprising reversing a direction of traversing a path segment.

4. The method of claim 1 wherein processing the preferred path using an A* algorithm comprises characterizing the at least one predetermined area to be avoided as a 2 dimensional polygon.

5. The method of claim 4 wherein processing the preferred path using an A* algorithm further comprises determining when a path candidate intersects the 2 dimensional polygon and then modifying that path candidate to provide a modified path candidate that includes some vertices of the 2 dimensional polygon such that the modified path candidate does not intersect the 2 dimensional polygon.

6. The method of claim 1 wherein the at least one predetermined area comprises a location that is not to be sprayed during the printing process.

7. The method of claim 6 further comprising:
   using the selected path to guide a continuous printing spray.

8. A processor-implemented method to facilitate determination of a path that comprises a plurality of specific locations, comprising:
   identifying the plurality of specific locations wherein the plurality of specific locations comprise locations to be sprayed during a printing process;
   using a processor to process a genetic algorithm to identify a preferred path that includes the plurality of specific locations, wherein the genetic algorithm has at least one fixed length chromosome that includes at least one gene, wherein the at least one gene comprises at least one polyline, wherein the at least one polyline comprises multiple contiguous path segments and wherein the at least one gene includes an indication of a direction of traversal for the at least one polyline of the at least one gene.

9. The method of claim 8 wherein using a genetic algorithm to identify a preferred path comprises using a genetic algorithm having a genetic operation comprising reversing a direction of traversing a path segment.

10. The method of claim 9 wherein the path further comprises at least one predetermined area to be avoided and wherein using the processor further comprises using the processor to process the preferred path using an A* algorithm to provide a selected path that includes the plurality of specific locations and that avoids the at least one predetermined area.

11. The method of claim 10 wherein using the processor to process the preferred path using an A* algorithm comprises characterizing the at least one predetermined area to be avoided as a 2 dimensional polygon.

12. The method of claim 11 wherein using the processor to process the preferred path using an A* algorithm further comprises using the processor to determine when a path candidate intersects the 2 dimensional polygon and then modifying that path candidate to provide a modified path candidate that includes some vertices of the 2 dimensional polygon such that the modified path candidate does not intersect the 2 dimensional polygon.

13. A processor-implemented method to facilitate determination of a path that comprises a plurality of specific locations and that avoids at least one predetermined area, comprising:
    identifying the plurality of specific locations;
    identifying the at least one predetermined area to be avoided and characterizing the at least one predetermined area to be avoided as a 2 dimensional polygon;
    using a processor, identifying a path candidate using a genetic algorithm and without considering the at least one predetermined area to be avoided, processing the path candidate using an A* algorithm to provide a selected path that includes the plurality of specific locations and that avoids the at least one predetermined area as a function, at least in part, of determining when a path candidate intersects the 2 dimensional polygon and then modifying that path candidate to provide a modified path candidate that includes some vertices of the 2 dimensional polygon such that the modified path candidate does not intersect the 2 dimensional polygon and such that a path length of the selected path is minimized;
    wherein the plurality of specific locations comprise locations to be sprayed during a printing process.

14. The method of claim 13 wherein using a genetic algorithm comprises using a genetic algorithm having at least one gene that comprises at least one polyline, wherein the polyline comprises multiple contiguous path segments.

15. The method of claim 13 wherein using a genetic algorithm comprises using a genetic algorithm having a genetic operation comprising reversing a direction of traversing a path segment.

16. The method of claim 13 wherein the plurality of specific locations comprise locations to be sprayed during a printing process and the at least one predetermined area comprises a location that is not to be sprayed during the printing process.

17. The method of claim 16 further comprising:
    using the selected path to guide a continuous printing spray.

* * * * *